United States Patent [19]

Babbitt

[11] Patent Number: 5,030,824
[45] Date of Patent: Jul. 9, 1991

[54] OPTICAL POSITION SENSOR EMPLOYING ENCODER DELAY

[75] Inventor: William R. Babbitt, Bellevue, Wash.

[73] Assignee: The Boeing Company, Seattle, Wash.

[21] Appl. No.: 484,349

[22] Filed: Feb. 22, 1990

[51] Int. Cl.[5] ............................................. H01J 5/16
[52] U.S. Cl. ............................ 250/227.12; 250/227.21
[58] Field of Search .................. 250/227.12, 227.21;
369/557; 375/45, 47; 455/605, 612, 615, 617, 610, 608

[56] References Cited

U.S. PATENT DOCUMENTS

| | | | |
|---|---|---|---|
| 3,327,584 | 6/1967 | Kissinger | 88/14 |
| 3,566,083 | 2/1971 | McMillin | 235/61.11 |
| 3,596,104 | 7/1971 | Macomber | 250/227.12 |
| 3,629,835 | 12/1971 | Brown et al. | 340/149 |
| 3,988,572 | 10/1976 | Constant | 235/61.11 E |
| 3,991,318 | 11/1976 | Duguay | 250/227.12 |
| 3,993,868 | 11/1976 | Balcewicz | 375/47 |
| 4,291,976 | 9/1981 | McMahon | 356/150 |
| 4,356,395 | 10/1982 | Miller | 250/227.12 |
| 4,405,199 | 9/1983 | Ogle et al. | 250/227.12 |
| 4,432,599 | 2/1984 | McMahon | 250/227.12 |
| 4,468,792 | 8/1984 | Baker et al. | 375/45 |
| 4,517,456 | 5/1985 | Halsall et al. | 250/226 |
| 4,641,025 | 2/1987 | Miller | 250/227 |
| 4,697,926 | 10/1987 | Youngquist et al. | 250/227.12 |
| 4,714,346 | 12/1987 | Eichen et al. | 356/349 |
| 4,775,216 | 10/1988 | Layton | 250/227.12 |
| 4,777,661 | 10/1988 | Spillman, Jr. | 455/605 |
| 4,824,251 | 4/1989 | Slotwinski et al. | 356/349 |
| 4,825,063 | 9/1989 | Halldorsson et al. | 250/227.12 |
| 4,849,624 | 7/1989 | Huggins | 250/226 |
| 4,928,316 | 5/1990 | Heritage | 455/617 |

Primary Examiner—David C. Nelms
Assistant Examiner—S. Allen
Attorney, Agent, or Firm—Christensen, O'Connor, Johnson & Kindness

[57] ABSTRACT

An optical sensor that uses laser radar techniques to determine the value of a mesaurand. The sensor comprises an encoder, an optical source, sensing means and detection means. The encoder has a plurality of tracks, each track including means for receiving an optical signal and for delaying the optical signal by an encoder delay that is a function of the measurand value. The optical source produces a chirped optical interrogation signal that is received by the sensing means and divided into N channel signals, such that each channel signal strikes one of the tracks. The sensing means delays each channel signal by a unique channel delay. The detection means receives the channel signals after they have struck the tracks, and mixes the channel signals with a facsimile of the interrogation signal, to produce a demodulated signal. The detection means analyzes the frequency components of the demodulated signal, to determine the encoder delays and thereby the value of the measured. The encoder preferably comprises a transparent moveable substrate having a variable pattern of reflecting elements on one side, and a uniform reflective coating on the opposite side.

11 Claims, 3 Drawing Sheets

OPTICAL POSITION SENSOR EMPLOYING ENCODER DELAY

FIELD OF THE INVENTION

The present invention relates to optical sensors and, in particular, to an optical sensor for determining the position of a moveable element.

BACKGROUND OF THE INVENTION

The problem addressed by the present invention is how to create an optical position sensor that has high precision, that can be read remotely, that has self-fault detection, and that can be multiplexed with other sensors. One previous solution to this problem, exemplified by U.S. Pat. No. 4,849,624, utilizes wavelength division multiplexing to transmit an optical interrogation signal to the sensor. At the sensor, the interrogation signal is demultiplexed, and one wavelength component is allowed to strike each encoder track. After being reflected or transmitted by the tracks, the different wavelength components are combined onto an optical fiber and transmitted back to a detector. At the detector, the return signal is demultiplexed, to thereby read the encoder pattern and determine the position of the encoder.

Time-division multiplexing techniques have also been used for reading encoders. For example, in the system described in U.S. Pat. No. 4,641,025, an optical interrogation pulse is divided into N channel pulses, one for each track, and each channel pulse is subject to a different time delay. The presence or absence of a return pulse in a given time slot then indicates the state (reflecting/nonreflecting) of an individual track.

A third prior approach to optical position sensors has been to employ analog rather than digital techniques. In an analog sensor, an interrogation signal containing two wavelength components is demultiplexed at the sensor. One wavelength component is transmitted through or reflected from an analog encoder track having a continuously variable reflectivity or transmissivity. The second wavelength component bypasses the track. The two components are then combined and returned to the detector. The detector determines the ratio of the intensity of the two wavelength components, to therefore determine the encoder position.

All of the above techniques suffer from a number of limitations. Both of the digital sensors described above have the disadvantages that their fault detection is incomplete, and that multiplexing of many channels is difficult. Another disadvantage of the time-division multiplexing technique is that it requires considerable quantities of optical fibers to create the requisite time delays. For example, for a 10-bit sensor, at least 5 meters of optical fiber would need to be coiled up inside each sensor. Analog sensors have the advantage of allowing self-fault detection by monitoring both reflection and transmission. However, they rely on wavelength-multiplexed reference beams that can be affected by wavelength-dependent losses. In addition, high-resolution analog masks for such sensors are difficult to design.

SUMMARY OF THE INVENTION

The disclosed invention incorporates the concept of digital optical sensors. However, instead of time-division multiplexing, a chirped optical signal is used to perform the readout. Either frequency modulated (FM) or intensity modulated (IM) chirped signals can be used. The higher distance/time delay resolution available with chirped signals allows for a simple way to achieve self-fault detection for each track.

In a preferred embodiment, the present invention provides an optical sensor for determining the value of a measurand. The sensor comprises an encoder, an optical source, sensing means, and detection means. The encoder has a plurality of tracks, each track including means for receiving an optical signal, and for delaying the optical signal by an encoder delay that is a function of the value of the measurand. The optical source produces a chirped optical interrogation signal that is received by the sensing means. The sensing means divides the interrogation signal into N channel signals, and couples each channel signal such that it strikes one of the tracks. The sensing means also includes means for delaying each channel signal by a predetermined channel delay, such that the channel delays differ from one another.

The detection means is coupled to receive the channel signals, after the channel signals have struck the respective tracks. The detection means includes means for mixing the channel signals with a facsimile of the interrogation signal, to produce a demodulated signal. The detection means also includes means for analyzing the frequency components of the demodulated signal, to determine the encoder delays produced by the tracks, to thereby determine the value of the measurand.

In a preferred embodiment, each track comprises means responsive to the value of the measurand for causing the respective channel signals to follow one of two or more possible paths, the paths having optical path lengths that differ from one another. More particularly, the encoder may comprise a transparent moveable substrate having a first side at which the channel signals are received, and a second side. The first side of the substrate has a variable pattern of reflecting elements positioned thereon, while the second side of the substrate includes a reflective coating that is uniform, or that is otherwise formed such that all channel signals that reach the second side are reflected. Each channel signal is either reflected from the first side of the substrate, to produce a "short" optical path length, or passes through the substrate and is reflected by the uniform reflective coating, to produce a relatively "long" optical path length.

DETAILED DESCRIPTION OF THE INVENTION

The present invention may be regarded as a chirped laser radar system. Such a system typically operates by sending out a "chirped" signal, i.e., a signal having a frequency that varies with time. Either a frequency modulated (FM) or intensity modulated (IM) chirped signal may be used. In a frequency modulated chirped signal, the frequency of an optical carrier signal, i.e., the wavelength of the light, is varied with time. In an IM chirped signal, the optical carrier has a fixed frequency, but is intensity modulated at a time-variable frequency. In both cases, the frequency variation is preferably linear, with the frequency versus time characteristic of the chirped signal typically having a sawtooth pattern.

If a chirped signal is divided into two signals and if the two signals are then combined without any differential delay, their instantaneous frequencies will be the same, and no differential beat frequency will be detected. However, if a chirped signal is combined with an identical chirped signal that has been delayed by an amount $\Delta t$, then the instantaneous frequencies of the two signals will be different. The frequency difference will be equal to the chirp rate, $\alpha$, times the time delay $\Delta t$.

In a chirped laser radar system, a chirped pulse is divided into first and second pulses, and the first pulse is transmitted to a target. The return pulse reflected from the target is combined with the second original pulse, in a process that can be termed demodulation. The result is a demodulated return pulse that has a frequency component at a frequency of $\alpha \Delta t$, where $\Delta t$ is now the round trip travel time to the target. Thus by measurement of the frequency of the demodulated return pulse, one can calculate the travel time, and thereby determine the distance to the target.

Figure 1:
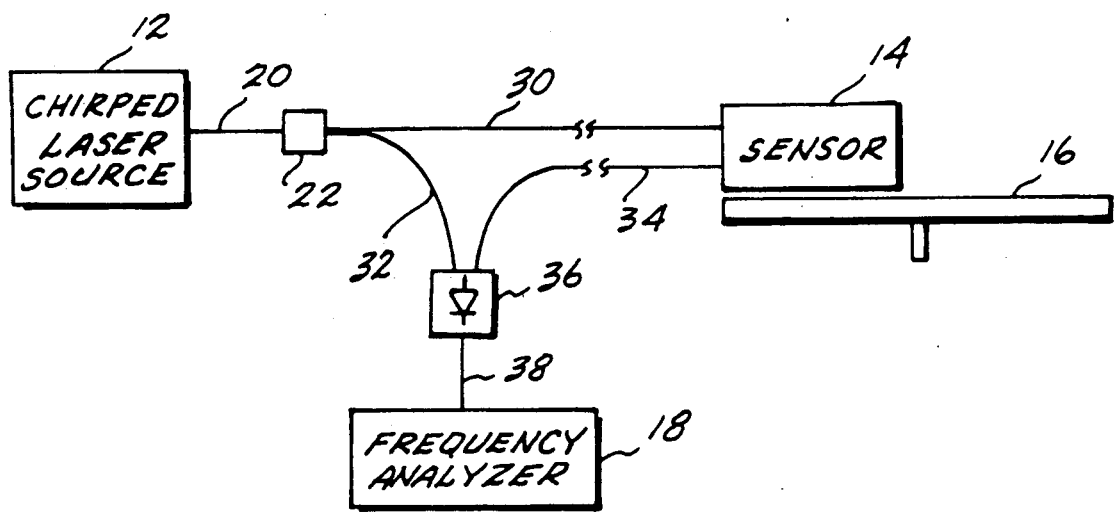
FIG. 1 is a block diagram of an FM embodiment of the present invention.

A first preferred embodiment of the present invention is illustrated in FIG. 1. The system includes FM chirped laser source 12, sensor 14, encoder 16, and frequency analyzer 18. Encoder 16 comprises a rotatable disc, although a linearly movable encoder could also be used. The encoder comprises N concentric tracks, or N parallel tracks in the case of a linear encoder. Each track reflects an incident optical signal, as further described below.

Chirped laser source 12 produces an FM chirped optical signal on fiber-optic cable 20 that is input to coupler 22. Coupler 22 divides the chirped optical signal into an interrogation signal on fiber-optic cable 30, and a "local oscillator" signal on fiber-optic cable 32. The interrogation signal is received by sensor 14, and used by the sensor to illuminate the tracks of encoder 16. The result is a reflected return signal on fiber-optic cable 34 that is combined coherently with the local oscillator signal, and converted to a corresponding electrical signal, by photodetector 36. The result is an electrical demodulated signal on line 38 that is input to frequency analyzer 18. Assuming that the round trip distance to and from sensor 14 is greater than the length of the path of the local oscillator signal on fiber-optic cable 32, the demodulated signal will contain a beat frequency corresponding to the path length difference.

Figure 2:
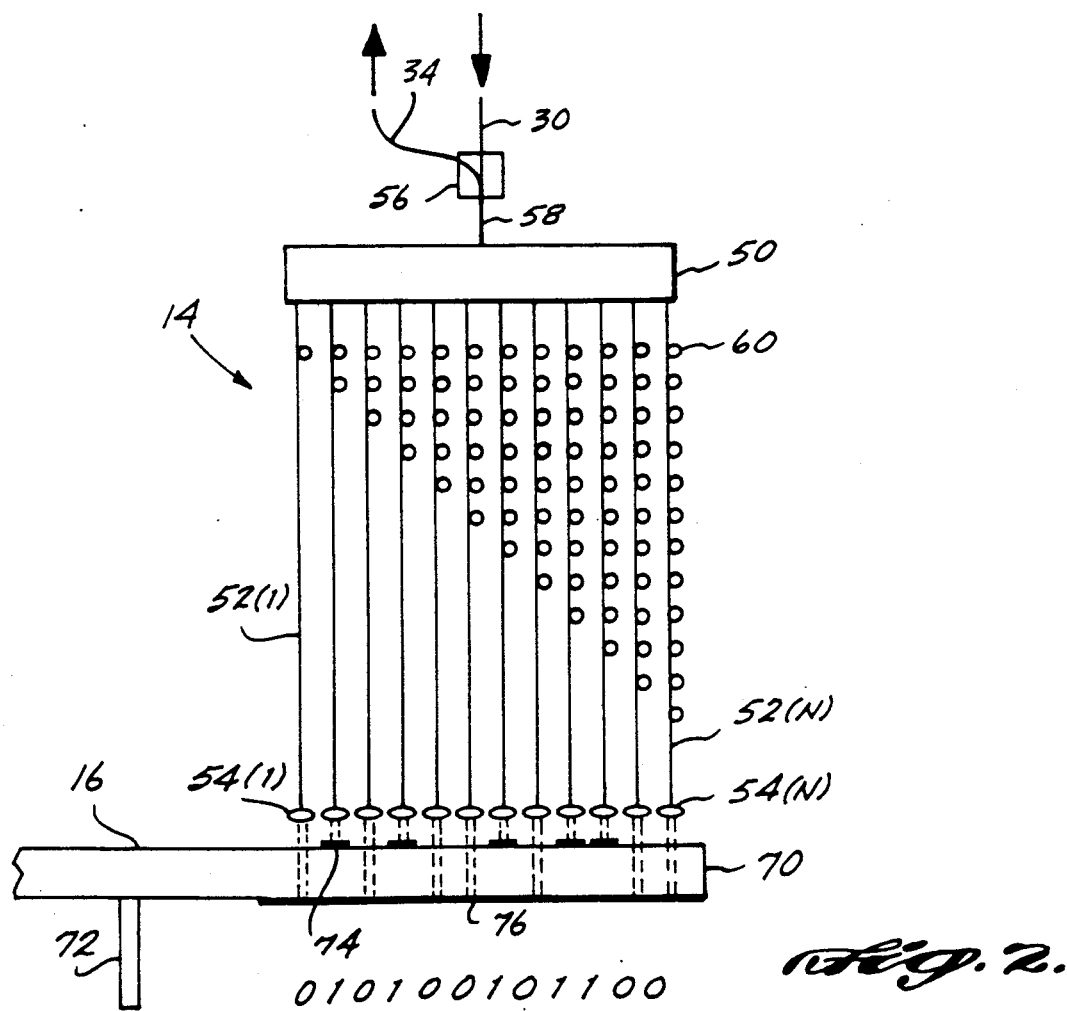
FIG. 2 is an optical schematic of a preferred embodiment of the sensor.

A preferred embodiment of sensor 14 and encoder 16 is illustrated in FIG. 2. Sensor 14 comprises divide-by-N star coupler 50, N fiber-optic cables 52(1)–52(N), and N lenses or other focusing/collimating devices 54(1)–54(N). The interrogation signal on fiber-optic cable 30 is input to star coupler 50 via coupler 56, and divided by the star coupler into N channel signals on the N fiber-optic cables 52. Fiber-optic cables 52 are constructed such that each has a length that is different from the lengths of the other fiber-optic cables 52. The required differences in length can be accomplished by placing one or more loops 60 in each fiber-optic cable, each loop here symbolizing a unit of extra path length or time delay. In the illustrated embodiment, fiber-optic cable 52(1) has one loop or delay unit, while fiber-optic cable 52(N) has N loops or delay units.

Encoder 16 comprises transparent substrate 70 mounted on rotatable shaft 72. The upper surface of substrate 70 includes a variable pattern of reflecting elements 74 arranged in circumferential tracks on the substrate, while the lower surface of substrate 70 includes a uniform reflective coating 76. In those positions where the upper surface of substrate 70 does not include a reflecting element 74, the upper surface is preferably treated with an anti-reflection coating, to reduce reflections from the upper substrate surface as much as possible. The channel signal on each of fiber-optic cables 52 is collimated or focused (provided substrate 70 is sufficiently thin) by the corresponding lens 54, and the light is directed onto one of the encoder tracks.

For those tracks that have a reflecting element 74 at a given encoder position, the channel signal is reflected by element 74 back into lens 54. For those tracks not including a reflecting element 74 at the current encoder position, the channel signal passes through substrate 70, and is reflected by coating 76 back into lens 54. For both cases, the reflected signals then pass through fiber-optic cables 52, each again experiencing a differential delay, and are combined by star coupler 50 into a return signal on fiber-optic cable 58. Coupler 56 then couples the return signal into fiber-optic cable 34, for transmission to photodetector 36 (FIG. 1). It will be appreciated by those skilled in the art that coupler 56 could be positioned adjacent coupler 22 and photodetector 36, rather than in sensor 14, such that the sensor could be coupled to the remainder of the optical system by a single fiber-optic cable.

The operation of the system described so far can be most readily understood by considering a single track. The channel signal that illuminates that track can travel one of two possible paths: a "short" path when there is a reflecting element 74 on that track, and a "long" path when there is no reflecting element 74. These two possible paths differ in length by twice the thickness of encoder substrate 70. Thus, when the channel signal travels the long path, it experiences a time delay, relative to the short path, equal to $2dn_s$, where d is the thickness of substrate 70, and $n_s$ is its index of refraction.

The described system may be characterized as a laser radar system, because the system in effect determines the distance to the reflector in each track. By determining whether this distance is relatively "short" or "long", the presence or absence of a reflecting element 74 in that track may be determined. As indicated beneath encoder 70 in FIG. 2, the presence of a reflecting element can be interpreted as a 1 bit, while the absence of a reflecting element can be interpreted as a 0 bit. The encoder is constructed such that at each rotational position around the encoder disc, a different pattern of 1 and 0 bits is read. Thus by measuring such pattern, the sensor system can infer the rotational position of the encoder and of shaft 72. In some cases, the shaft rotational position is the measurand that is to be determined. In other cases, the shaft is made to rotate in accordance with the measurand of interest.

Figure 3:
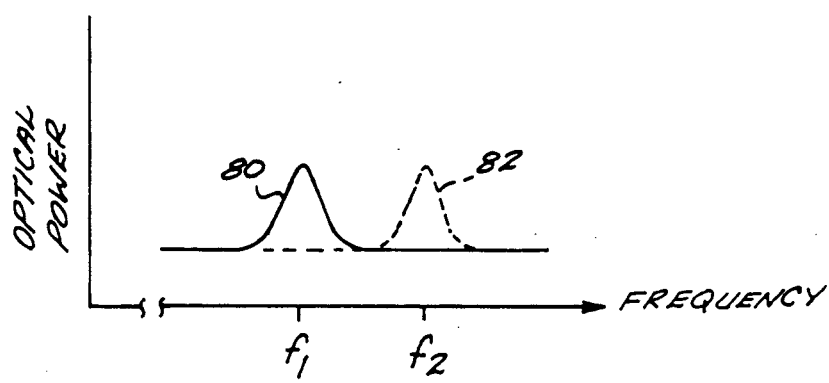
FIG. 3 is a graph illustrating returns from a single track.

Again referring to only a single track, the signal reflected by that track returns via fiber-optic cable 52 and couplers 50 and 56 into fiber-optic cable 34, and is mixed with the local oscillator signal in photodetector 36. As described above, the return pulse will have experienced one of two possible time delays, depending upon the presence or absence of reflecting element 74 on the track. Thus the demodulated electrical signal produced by photodetector 36 will include one of two possible beat frequencies, again depending upon the presence or absence of a reflecting element. These two possible beat frequencies correspond to peaks 80 and 82 shown in FIG. 3. By determining the presence of frequencies at either $f_1$ or $f_2$ in the demodulated signal, frequency analyzer 18 can determine the presence or absence of a reflecting element 74 on the track. With reference to FIGS. 2 and 3, peak 80 at frequency $f_1$ corresponds to a "short" path, and therefore to a 1 bit, while peak 82 at frequency $f_2$ corresponds to a "long" path, or a 0 bit.

Considering now all N tracks of encoder 16, it will be seen that each track will produce a return pulse that has followed either a "short" or "long" path. Thus each track will produce a beat frequency at one of two possible frequency values in the demodulated signal. To avoid ambiguity as to which frequency is associated with which track, delay elements 60 are included in sensor 14. The delay elements insure that the two possible path lengths or time delays for a given track do not overlap the possible path lengths for other tracks. As a result, the two possible beat frequencies produced by each track do not overlap the possible beat frequencies for other tracks. The optical path length of each of the delay elements 60 should be on the same order as, or greater than, the optical path length of encoder substrate 70.

Figure 4:
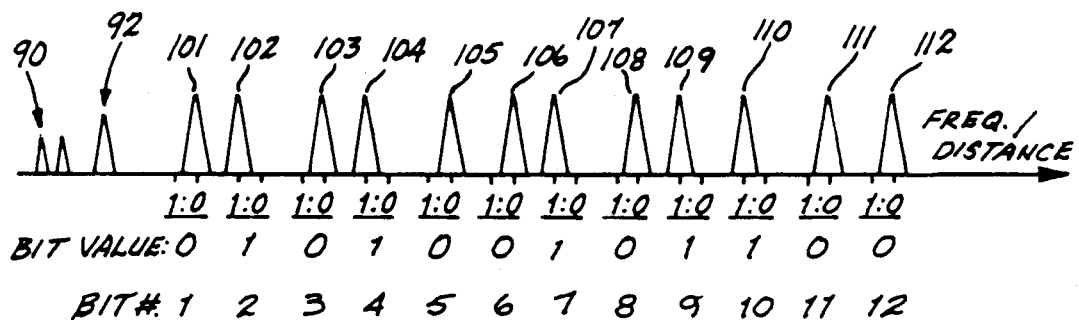
FIG. 4 is a graph illustrating returns from multiple tracks.

Frequency analyzer 18 may comprise a spectrum analyzer for measuring the power spectrum of the demodulated signal. A graph representing such a spectrum is shown in FIG. 4, wherein the horizontal axis represents frequency or, equivalently, the distance to the reflecting surface of a given track, and the vertical axis represents power at that frequency. FIG. 4 assumes that the encoder, at its present position, presents the 12-bit pattern shown in FIG. 2.

Peaks 90 represent reflections from couplers between coupler 22 and star coupler 50, while peak 92 represents the optical reflection from the star coupler. This reflection is useful, since it serves to establish a reference distance or frequency. In particular, all other peaks in the frequency spectrum are measured with respect to this peak, thus eliminating errors in distance measurements due to index and length changes in the fibers coupling the sensor to the remainder of the system. If the star coupler's quality is too high, i.e., if the reflection is negligible, another reference should preferably be created, for example, by providing an additional track that always has a reflecting element 74, or that never has a reflecting element.

Peak 101 in FIG. 4 represents the reflection from the first track, i.e., the leftmost track in FIG. 2. This peak can have two positions, depending upon the presence or absence of a reflecting element in this track. These two frequency values are indicated by tick marks along the horizontal axis, the tick marks being labeled 1 for the lower frequency possibility, and 0 for the upper frequency possibility. Since in FIG. 2 there is no reflecting element present, the channel signal for this track travels the relatively "long" path length, with the result being that peak 101 is centered over the higher 0 bit slot, and the first track is assigned a bit value of 0. Peaks 102-112 represent the returns from the other 11 tracks shown in FIG. 2. The corresponding bit values are indicated below the horizontal axis in FIG. 4.

The difference in the beat frequencies of a single channel, $\Delta f_{01}$, may be determined as follows:

$$\Delta f_{01} = 2\alpha n_s d/c$$

where $n_s$ is the index of refraction of the substrate material, and d is the substrate thickness. The system must have a frequency resolution less than $\Delta f_{01}$. As the frequency resolution approaches $\Delta f_{01}$, the bit error rate will increase dramatically. The frequency analyzer preferably verifies that only one large peak occurs per channel. When this is done, the system does not have to differentiate between two targets within $\Delta f_{01}$, but must only determine the center of each peak to within $\Delta f_{01}$. The width of each peak can thus be larger than $\Delta f_{01}$, as long as the center of the peak can be determined to be better than $\Delta f_{01}$.

The resolution of the system will be affected by the losses in the system, and by small reflections, such as the reflection from the upper surface of substrate 70 when no reflecting element 74 is present. The thickness d of the substrate may be on the order of 1 millimeter. The resolution of fiber-optic based laser radars is on the order of 10-100 microns, so that resolutions on the order of a millimeter are obtainable. Since the system is actually measuring optical delays, the thickness of the substrate could be decreased, or the required resolution increased, by using a substrate material with a high index of refraction.

The distance between two channels is determined by the length of fiber-optic delay loops 60 shown in FIG. 2. If a loop represents a length $\Delta l$ of fiber, and if the index of the fiber is $n_f$, then the frequency difference between adjacent channels will be $\Delta f_{ch}$ as follows:

$$\Delta f_{ch} = 2\alpha n_f \Delta l/c$$

Figure 5:
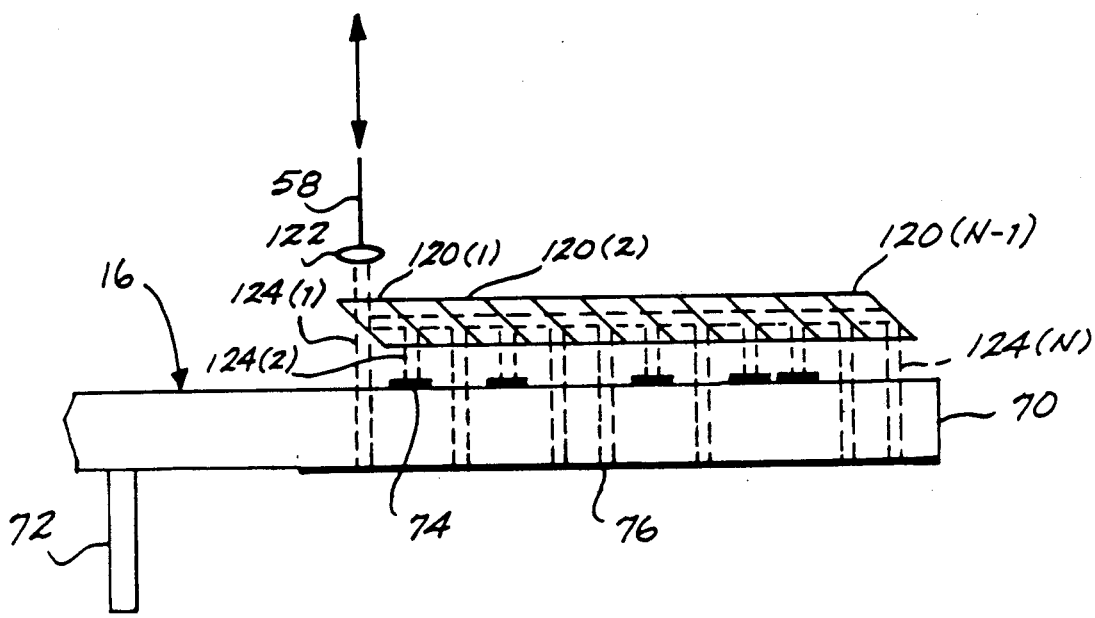
FIG. 5 is an optical schematic of a second preferred embodiment of the sensor.

The system must be able to locate multiple targets that are spaced apart from one another by an amount $\Delta l - d$. The frequency discrimination of a chirped radar is roughly 2/T, where T is the sampling time, i.e., the duration of the chirp pulse. If T is 1 millisecond, and $n_f$ is 1.5, and the chirp bandwidth $\alpha T$ is 2 GHz, then the delays $\Delta l$ need to be around 10 centimeters. This is a factor of 10 reduction in the amount of fiber needed compared to previous time division multiplexed digital rotary sensors. If the chirp bandwidth is increased to 20 GHz, only 1 centimeter delays would be needed. The tolerance on the length of the fiber-optic delays, if the sensors are to be interchangeable, should be less than half the thickness of the disk, assuming that the index of refraction of the fiber and the disk are the same. The tolerances on the fibers could be relaxed if the index of refraction of the disk is higher than that of the fibers. Alternatively, delays of the radar system could go through a calibration process with all bits set to "1" to measure the delay of each channel with respect to the reference reflection. If a chirped bandwidth is further increased, the spacing between channels can be reduced to a few millimeters, and the thickness of the disk can be reduced to less than a millimeter. In such a case, delays other than fiber-optic delays could conveniently be used. Such an embodiment is illustrated in FIG. 5. The sensor shown in FIG. 5 includes partial reflecting elements 120(1) through 120(N−1), where N is the number of tracks. Lens 122 collimates the light from fiber-optic cable 58, and the light is directed onto the upper face of element 120(1). The left-hand face of element 120(1) is oriented at a 45 degree angle to the incident light, and divides such light into channel signal 124(1) that strikes the first track, and a second signal that travels to the right through the body of element 120(1). At the interface between elements 120(1) and 120(2), a second channel signal 124(2) is created that travels downward to strike the second track, with the remainder of the optical signal continuing to travel to the right. This process continues until the rightmost face of element 120(N−1) is encountered, at which point all the remaining power is directed downward onto the Nth track as channel signal 124(N). Focusing elements (not shown) may be included between each element 120 and its corresponding track, to focus light onto the track to increase angular resolution. Light reflected from the tracks travels the reverse paths back into fiber-optic cable 58. The reflectivities of the reflecting elements are preferably selected to the 11th/12, 1/11, 1/10 . . . $\frac{1}{3}$, $\frac{1}{2}$, and 1, to produce roughly equal attenuation for each channel signal.

The losses in the sensor systems described include losses in the fibers (about 1 dB), losses in the star coupler or reflecting elements (roughly $N^2$), and losses coupling out of the fiber to the reflectors and back (10 dB). For a 12-bit digital sensor, the loss would be roughly 33 dB. To this figure, it is necessary to add connector losses back to the laser radar system (4–5 connectors) at 1.5 dB each, and couplers to other sensors. With losses on the order of 50 dB, laser radar systems are predicted to have better than $10^{-2}$ centimeter resolution.

The present invention readily permits the multiplexing of plural sensors into a single system. For example, in FIG. 2, an optical coupler could be placed in fiber-optic cable 30, to divide the interrogation signal into a first interrogation signal for sensor 14, and a second interrogation signal that is coupled to one or more additional sensors. Returns from different sensors could be distinguished by arranging the sensors such that each is positioned at a unique distance from the source/photodetector portion of the system. Alternately, individual sensors in a multiple sensor system could be identified by their "pre-blip" signatures. Artificial reflectors could also be introduced to label an individual sensor, so that a knowledge of the sensor's distance is not required to identify it.

It should be noted that the described sensors have self-fault detection in each channel. In particular, a signal is returned from each working channel, whether or not the channel contains a 0 or a 1 bit. Failure to detect either of the two possible frequencies therefore indicates that the channel has failed. Nevertheless, all other channels would still remain usable. If two redundant sensors failed in different channels, the information from the two sensors could be combined to give a reliable reading.

The angular resolution of the rotary sensor is limited by the spot size of the channel signals on the encoder surface, and the radius of the encoder disk. To maintain a collimated beam over 2 millimeters (twice a typical substrate thickness), the beams would have to be collimated to roughly a 50 micron diameter, or focused to a 50 micron spot. To obtain 0.1 degree resolution with a 50 micron spot, a two-inch diameter encoder would be required. If the distance resolution of the system is better than a millimeter, the thickness of the encoder can be decreased. A factor of 4 decrease in the substrate thickness would decrease the diameter required by a factor of 2. The spot size problem might be alleviated by pixilating the disk.

Figure 6:
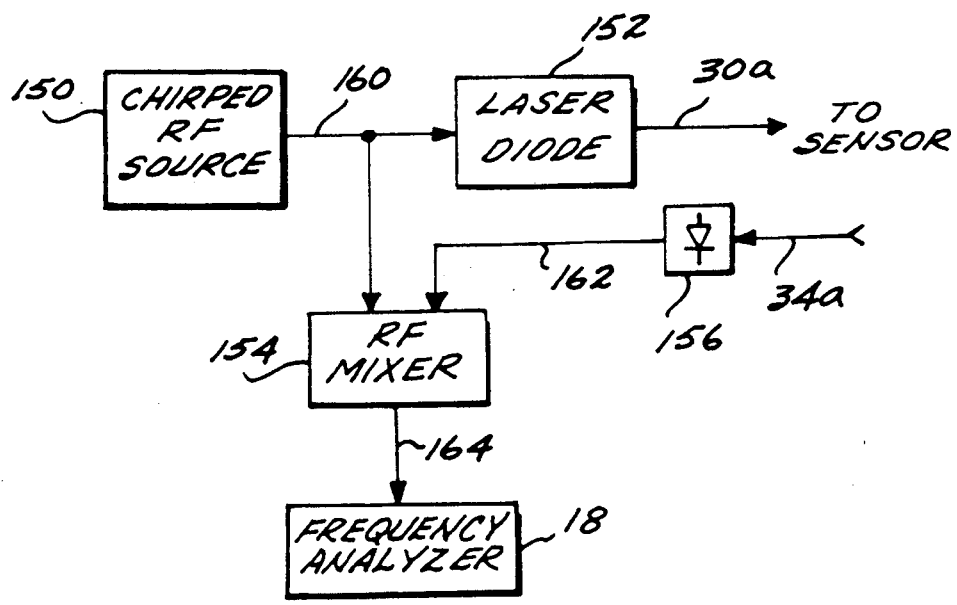
FIG. 6 is a block diagram of an IM embodiment of the sensing system.

The systems described above have been based on a frequency modulated chirped laser source, i.e., a laser having an output whose frequency (i.e., wavelength) varies with time. Another approach is to use an intensity modulated (IM) source to produce the chirped interrogation signal, as shown in FIG. 6. The system of FIG. 6 includes chirped RF source 150, laser diode 152, RF mixer 154, and photodetector 156. Chirped RF source 150 produces an RF output signal on line 160 having a frequency that varies with time. For example, the frequency of RF output signal 160 could vary from 2 to 6 GHz. RF output signal 160 is used to intensity modulate laser diode 152, such that the interrogation signal produced by laser diode 152 on fiber-optic cable 30a undergoes periodic intensity variations. The frequency of the intensity variations varies in accordance with the frequency sweep of the RF output signal on line 160. Thus the frequency of the intensity modulation of the optical interrogation signal varies in a manner analogous to the variation in the optical frequency or wavelength of the FM system described above. It will be understood that laser diode 152 could be replaced by any light source that is capable of being intensity modulated. Demodulation could either be direct, as with a laser diode, or external, using electro-optic or acousto-optic modulators.

The return signal from the sensor on fiber-optic cable 34a is input to photodetector 156, to produce a corresponding electrical return signal on line 162. The RF output signal from line 160 and the electrical return signal on line 162 are combined in RF mixer 154, to produce a demodulated signal on line 164 that is analyzed by frequency analyzer 18 in a manner similar to the analysis for the FM case.

While the preferred embodiments of the invention have been described, variations will be apparent to those skilled in the art. Accordingly, the scope of the invention is to be determined by reference to the following claims.

The embodiments of the invention in which an exclusive property or privilege is claimed are defined as follows:

1. An optical sensor for determining a value of a measurand, the sensor comprising:
   (a) an encoder having a plurality of tracks, each track including means for receiving an optical signal and for delaying the optical signal by an encoder delay that is a function of the value of the measurand;
   (b) an optical source including means for producing a chirped optical interrogation signal;
   (c) sensing means including means for receiving the interrogation signal, means for dividing the interrogation signal into N channel signals, means for coupling each channel signal such that it strikes one of the tracks, and means for delaying each channel signal by a predetermined channel delay such that the channel delays differ from one another;
   (d) detection means coupled to receive the channel signals after the channel signals have struck the respective tracks, the detection means including means for mixing the channel signals with a facsimile of the interrogation signal to produce a demodulated signal, and means for analyzing the frequency components of the demodulated signal to determine the encoder delays produced by the tracks, to thereby determine the value of the measurand.

2. The sensor of claim 1, wherein each track comprises means responsive to the value of the measurand for causing the respective channel signals to follow one of two or more possible paths, the paths of each track having optical path lengths that differ from one another.

3. The sensor of claim 2, wherein the encoder comprises a transparent moveable substrate having a first side at which the channel signals are received and a second side, the first side of the substrate having a pattern of reflecting elements positioned thereon.

4. The sensor of claim 3, wherein the second side of the substrate includes a reflective coating formed such that all channel signals that reach the second side are reflected by the reflective coating.

5. The sensor of claim 1, wherein the chirped optical interrogation signal comprises a frequency modulated chirped signal having a frequency that varies with time.

6. The sensor of claim 1, wherein the chirped optical interrogation signal comprises an intensity modulated chirped signal having an intensity that is modulated at a frequency that varies with time.

7. The sensor of claim 1, wherein the detection means comprises a photodetector connected to receive the channel signals, and to convert the channel signals into corresponding electrical signals.

8. The sensor of claim 1, wherein the sensing means further comprises means for combining the channel signals that strike the tracks into a return signal, and wherein the detection means is coupled to receive the return signal and mixes the return signal with the facsimile of the interrogation signal to produce the demodulated signal.

9. The sensor of claim 1, wherein the sensing means comprises a star coupler for dividing the interrogation signal into N channel signals.

10. The sensor of claim 9, wherein the sensing means comprises N fiber-optic cables, each fiber-optic cable being coupled to receive a respective one of the channel signals from the star coupler and to convey the channel signal to the respective track.

11. The sensor of claim 1, wherein the sensing means comprises $N-1$ prisms for dividing the interrogation signal into the N channel signals, and for delaying the channel signals with respect to one another.

* * * * *